(12) United States Patent
Chiu et al.

(10) Patent No.: US 10,969,948 B2
(45) Date of Patent: Apr. 6, 2021

(54) METHOD FOR ADAPTIVELY ADJUSTING AMOUNT OF INFORMATION IN USER INTERFACE DESIGN AND ELECTRONIC DEVICE

(71) Applicant: National Tsing Hua University, Hsinchu (TW)

(72) Inventors: Ming-Chuan Chiu, Hsinchu (TW); Jia-Jiu Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 313 days.

(21) Appl. No.: 16/247,599

(22) Filed: Jan. 15, 2019

(65) Prior Publication Data
US 2020/0133468 A1 Apr. 30, 2020

(30) Foreign Application Priority Data
Oct. 25, 2018 (TW) .................................. 107137790

(51) Int. Cl.
*G06F 3/0484* (2013.01)
*G06F 3/0482* (2013.01)

(52) U.S. Cl.
CPC ........ *G06F 3/04845* (2013.01); *G06F 3/0482* (2013.01); *G06F 2203/04803* (2013.01)

(58) Field of Classification Search
CPC .... G06F 3/0482; G06F 3/04845; G06F 9/451; G06F 3/048; G06F 40/151; G06F 3/04847; G06F 3/013
See application file for complete search history.

(56) References Cited

U.S. PATENT DOCUMENTS

| 2012/0105486 A1* | 5/2012 | Lankford | G06F 3/0481 345/661 |
| 2018/0101605 A1* | 4/2018 | Walters | G06F 16/338 |

FOREIGN PATENT DOCUMENTS

CN 103500166 7/2016

OTHER PUBLICATIONS

J. Nielsen, "Users' Pagination Preferences and 'View All'," published on Apr. 28, 2013, downloaded from https://www.nngroup.com/articles/item-list-view-all (Year: 2013).*
"Office Action of Taiwan Counterpart Application," dated Dec. 17, 2019, p. 1-p. 4.

* cited by examiner

*Primary Examiner* — Eric J Yoon
(74) *Attorney, Agent, or Firm* — JCIPRNET

(57) ABSTRACT

The disclosure proposes a method for adaptively adjusting amount of information in user interface design and an electronic device. The method includes: obtaining a software structure and reading a user interface in the software structure; identifying a number of a plurality of informative items in the user interface; updating the user interface by removing a part of the informative items if the number of the informative items is not in a predetermined range, wherein the number of the informative items in the updated user interface is in the predetermined range.

20 Claims, 6 Drawing Sheets

METHOD FOR ADAPTIVELY ADJUSTING AMOUNT OF INFORMATION IN USER INTERFACE DESIGN AND ELECTRONIC DEVICE

CROSS-REFERENCE TO RELATED APPLICATION

This application claims the priority benefit of Taiwan application serial no. 107137790, filed on Oct. 25, 2018. The entirety of the above-mentioned patent application is hereby incorporated by reference herein and made a part of this specification.

BACKGROUND OF THE INVENTION

1. Field of the Invention

The present disclosure relates to a method of adjusting a user interface and an electronic device thereof, and more particularly to a method and an electronic device for adaptively adjusting the amount of information in a user interface.

2. Description of Related Art

In a product, the user interface (UI) plays a very important role, which can directly affect the customers' experience and satisfaction with the product. However, when designing the user interface of products, the schedule and the required amount of information is very large and complicated, which often causes obstacles in communication between the developer and the designer. In addition, according to some theories about the amount of information of the user interface, the amount of information contained in each user interface should be controlled, otherwise it may result in reduced user performance and increased user psychological burden.

However, since the conventional user interface design mechanism cannot reasonably and efficiently allocate the amount of information in a user interface, the designed user interface implicitly increases the user's psychological burden, and the user may feel a poor operating experience accordingly.

SUMMARY OF THE INVENTION

The present disclosure provides a method for adaptively adjusting the amount of information in a user interface, including: obtaining a software architecture and reading a first user interface in the software architecture; identifying a number of a plurality of first informative items in the first user interface; in response to the number of the first informative items in the first user interface does not fall within a predetermined range, removing a first part of the first informative items to update the first user interface, wherein the number of the first informative items in the updated first user interface falls within the predetermined range.

The disclosure provides an electronic device comprising a storage circuit and a processor. The storage circuit stores a plurality of modules. The processor is coupled to the storage circuit and accesses the module to perform the following steps: obtaining a software architecture and reading a first user interface in the software architecture; identifying a number of a plurality of first informative items in the first user interface; in response to the number of the first informative items in the first user interface does not fall within a predetermined range, removing a first part of the first informative items to update the first user interface, wherein the number of the first informative items in the updated first user interface falls within the predetermined range.

In an embodiment of the present disclosure, the method further includes adding a plurality of user interfaces, and arranging the first part to the user interfaces, wherein the number of the first informative items in each of the user interfaces falls into the predetermined range.

In an embodiment of the disclosure, the predetermined range is 5 to 8.

In an embodiment of the present disclosure, the method further includes: reading a second user interface in the software architecture; identifying a number of a plurality of second informative items in the second user interface; in response to the number of the second informative items in the second user interface does not fall within the predetermined range, removing a second part of the second informative items to update the second user interface, wherein the number of the second informative items in the updated second user interface falls within the predetermined range.

In an embodiment of the present disclosure, the software architecture further includes a second user interface subsequent to the first user interface, the first user interface is configured to receive input information, where the input information correspond to a plurality of interface functions, wherein when a logic operation result of the interface functions are true, subsequently providing the second user interface.

In one embodiment of the disclosure, the aforementioned input is returned to a backend database for storage.

In an embodiment of the disclosure, the software architecture records a primary activity, an input message, and output information in the first user interface based on a first functional model.

In an embodiment of the present disclosure, the software architecture records a plurality of interface functions in the first user interface and a logic operation relationship between the interface functions based on a second functional model.

In an embodiment of the disclosure, the software architecture implements a connection to a backend database based on an entity relationship model.

In an embodiment of the disclosure, the first functional model is an IDEF (ICAM Definition Languages) 0 model, and the second functional model is an IDEF (ICAM Definition Languages) 3 model.

In an embodiment of the disclosure, the first informative item includes at least one of a tag, a field, a button, a menu, and an icon.

In an embodiment of the disclosure, the step of identifying the number of the first informative items in the first user interface includes: capturing a plurality of eye images continuously for the eyes of a user viewing the first user interface; analyzing the eye image to find a plurality of reference positions where the user's eyes stay for more than a predetermined time; and defining a number of the reference positions as the number of the first informative items.

In an embodiment of the present disclosure, the step of identifying the number of the first informative items in the first user interface includes: in response to determining that there is a user viewing the first user interface, controlling an external eye tracker to track a viewing behavior of the user's eyes for the first user interface, wherein the eye tracker records a plurality of pictures on the user's eyes, and marks a plurality of reference positions of the user's eyes staying in the pictures; and receiving a number of the reference positions returned by the eye tracker and defining the number of the reference positions as the number of the first informative items.

Based on the above, the method for adaptively adjusting the amount of information in the user interface and the electronic device thereof can adaptively reduce the informative items in the user interface when there are too many informative items in the user interface. In this way, when the user interface is operated, the user does not have an extra psychological burden due to the excessive number of informative items, thereby correspondingly improving the user's operating experience.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
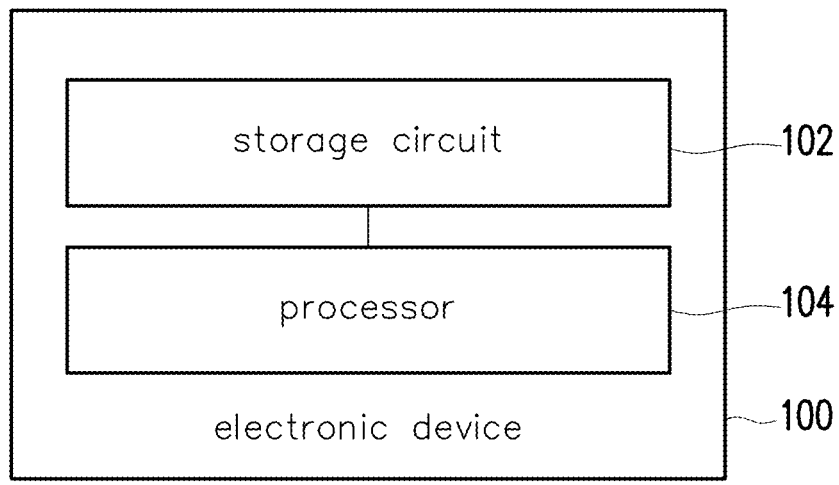
FIG. 1 is a functional block diagram of an electronic device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Please refer to FIG. 1, which is a functional block diagram of an electronic device according to an embodiment of the disclosure. In the embodiment, the electronic device 100 includes a storage circuit 102 and a processor 104. The electronic device 100 may be a mobile phone, a smart phone, a personal computer (PC), a notebook computer, a netbook PC, a tablet PC, or the like, but is not limited thereto.

The storage circuit 102 is, for example, any type of fixed or removable random access memory (RAM), read-only memory (ROM), flash memory, hard disc or other similar device or combination of these devices can be used to record a plurality of codes or modules.

The processor 104 is coupled to the storage circuit 102 and can be a general purpose processor, a specific purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

In the following embodiments, the processor 104 can access the modules and codes stored in the storage circuit 102 to implement the method for adaptively adjusting the amount of information in the user interface proposed by the present disclosure. Roughly speaking, the method of the present disclosure can reduce the amount of information in the user interface correspondingly when the user interface includes too much information, so as to prevent the user from feeling excessive psychological burden for seeing/facing/dealing with to too much information at once.

In order to facilitate the description of the concept of the present disclosure, only a single user interface (hereinafter referred to as a first user interface) is used as an object of performing the method of the present disclosure, but it is not intended to limit the possible implementations of the present disclosure. In other embodiments, when the considered software architecture includes a plurality of user interfaces, the method proposed by the present disclosure can also be used to adjust the amount of information in each user interface.

Figure 2:
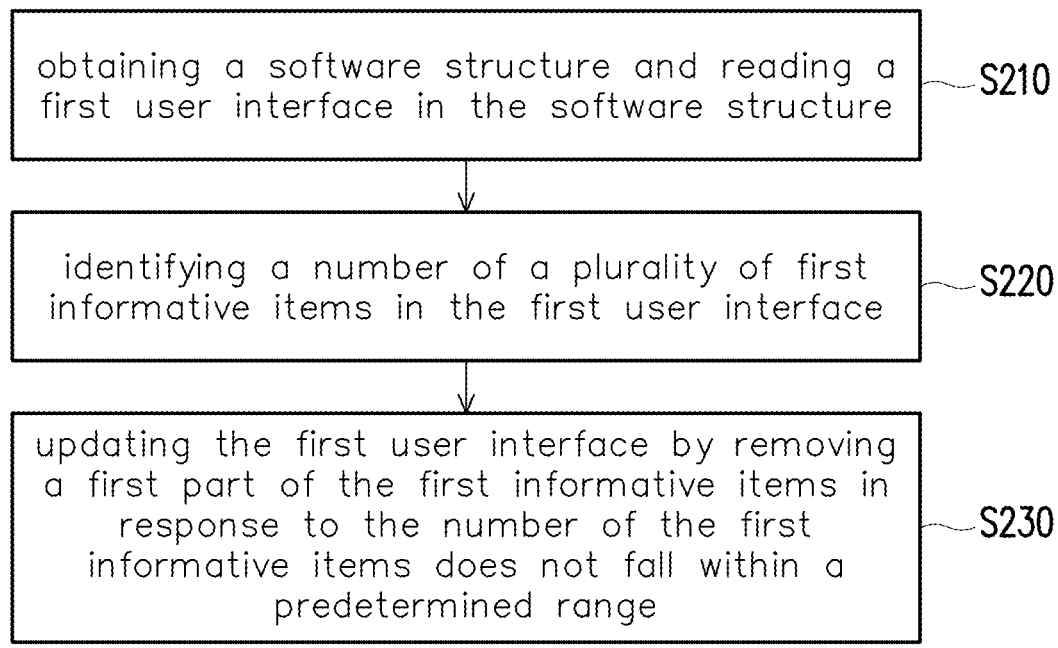
FIG. 2 is a flowchart of a method for adaptively adjusting the amount of information in a user interface according to an embodiment of the present disclosure.
Figure 3:
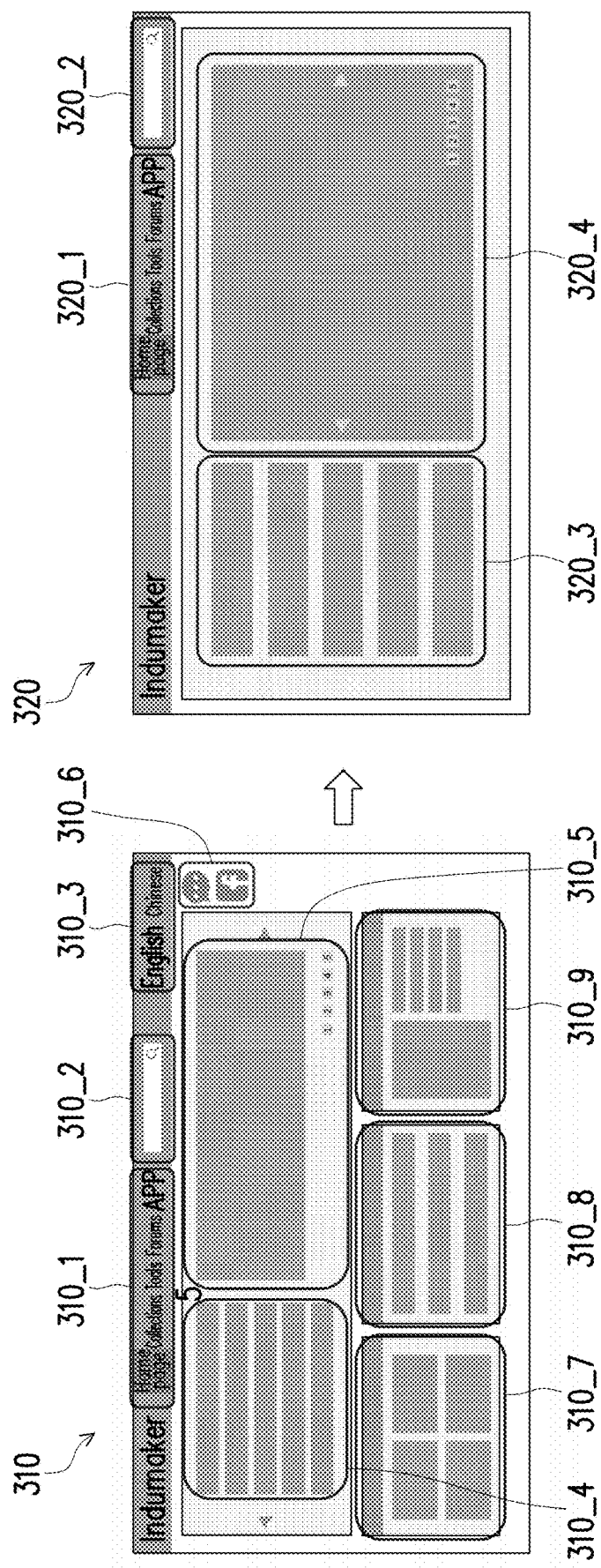
FIG. 3 is an application scenario of an embodiment of the present disclosure.

Referring to FIG. 2 and FIG. 3, FIG. 2 is a flowchart of a method for adaptively adjusting the amount of information in a user interface according to an embodiment of the present disclosure, and FIG. 3 is an application scenario of an embodiment of the present disclosure. The method of this embodiment can be performed by the electronic device 100 of FIG. 1, and the details of the steps of FIG. 2 will be described below in conjunction with the elements of FIG. 1 and the scenario of FIG. 3.

First, in step S210, the processor 104 can obtain the software architecture and read the first user interface 310 in the software architecture. In different embodiments, the foregoing software architecture may be an application (APP) architecture or a webpage architecture, but the present disclosure is not limited thereto.

In step S220, the processor 104 can identify a number of a plurality of first informative items in the first user interface 310. In FIG. 3, the first user interface 310 includes, for example, first informative items 310_1, 310_2, 310_3, 310_4, 310_5, 310_6, 310_7, 310_8, and 310_9, that is, the number of first informative items 310_1-310_9 is 9. Moreover, the aspects of the first informative items 310_1-310_9 include, for example, at least one of a tag, a field, a button, a menu, and an icon, but is not limited thereto. In various embodiments, the processor 104 can find the informative items possibly included in the first user interface 310 by analyzing the source code of the first user interface 310 The informative items may be, for example, the fields for the user to enter an account and passwords to log in, a field for inputting a keyword for searching (for example, the first informative item 310_2), or a button or tag (such as the first information 310_6) for the user to click, etc., but the disclosure is not limited thereto.

In an embodiment, the processor 104 can identify what informative items exist in the first user interface 310 based on the viewing behavior for the first user interface 310 of the user of the electronic device 100. Specifically, the processor 104 can control an image capturing circuit 106 of the electronic device 100 to continuously capture a plurality of eye images of the user, and perform an eyeball tracking operation accordingly. In one embodiment, the processor 104 can analyze the eye images to find a plurality of reference positions where the user's eyes stay for more than a predetermined time. In this embodiment, when the user's eyes are in a staying behavior when viewing the first user interface 311, the user is reading a certain information item in the first user interface 311. In other words, the number of stops of the user's eyes during viewing of the first user interface 311 should be the number of first informative items in the first user interface 311.

Therefore, the processor 104 can define the number of the reference positions as the number of the first informative items. Taking FIG. 3 as an example, when the user holds the electronic device 100 to view the first user interface 311, the processor 104 can determine, based on the captured eye images, that there are nine positions where the user's eyes stay for more than a predetermined time (for example, 5 seconds), and hence the processor 104 may determine that there are 9 informative items in the first user interface 311. Moreover, in an embodiment, the processor 104 can also derive the relative positions of the 9 informative items (i.e., the first informative items 310_1-310_9) on the first user interface 311 based on the relative position between the positions where the user's eyes stay, and further find the positions of the first informative items 310_1-310_9 in the first user interface 311.

In another embodiment, the electronic device 100 can be further connected to an external eye tracker, so as to obtain the user's viewing behavior for the first user interface 311 through the eye tracker. Specifically, when the processor 104 determines that a user is currently viewing the first user interface 311, the processor 104 can activate the eye tracking device (which can be disposed, for example, on the smart glasses worn by the user) to record the user's eyes. Accordingly, the eye tracker can mark the reference positions where the user's eyes stay in the recorded picture after recording the user's eyes. Then, the eye tracker can return the number of identified reference positions to the electronic device 100, and the processor 104 can use the number of the reference positions as the number of informative items in the first user interface 311, but the present disclosure is not limited thereto.

Then, in step S230, in response to the number of the first informative items 310_1-310_9 in the first user interface 310 does not fall within the predetermined range, the processor 104 may remove a first part of the first informative items 310_1-310_9 to update the first user interface 310. In the embodiment of the present disclosure, the predetermined range is, for example, 5 to 8.

Specifically, as exemplarily illustrated in FIG. 3, the first user interface 310 includes at least nine informative items (i.e., the first informative items 310_1-310 310_9), which does not fall within the predetermined range. However, according to the research results of the paper "*An optimal range of information quantity on computer-based procedure interface design in the advanced main control room*" (Min-Chih Hsieh, Ming-Chuan Chiu & Sheue-Ling Hwang, 2015), the optimal number of informative items in a user interface should be between 5 and 8 (i.e., the predetermined range), so that the user can operate without feeling unnecessary psychological burden. In other words, the amount of information corresponding to the 9 first informative items 310_1-310_9 in the first user interface 310 is obviously sufficient to cause the user to have an unnecessary psychological burden during operation, thereby the user's operation experience may be deteriorated.

Accordingly, the processor 104 may remove a first part of the first informative items 310_1-310_9 to update the amount of information in the first user interface 310. In an embodiment, the processor 104 may disable the first part by modifying the codes, so that the updated first user interface 310 no longer displays the first part.

In an embodiment, the processor 104 may accumulate the browsing time of the first informative items 310_1-310_9 by the user, and sort the first informative items 310_1-310_9 in a descending order accordingly. Next, the processor 104 may regard the first informative items sorted after the eighth position as the first part to be removed.

In addition, in other embodiments, the processor 104 may further add the browsing time of the first eight first informative items 310_1-310_9 to a total browsing time, and find out that the specific informative items whose browsing time is less than 10% of the total browsing time. Next, the processor 104 can add the found specific informative item to the first part to be removed.

In an embodiment, the processor 104 can directly block the display area corresponding to the first part by using a color block or other similar manners, so that the user cannot see the first part in the updated first user interface, but the disclosure is not limited thereto.

The updated first user interface 310 is, for example, a first user interface 320 as shown in FIG. 3, which may include first informative items 320_1, 320_2, 320_3, 320_4. In this embodiment, after realizing that the first informative item 310_5 (i.e., for letting the user know the detailed content of each function of the first informative item 310_4) is included in the first user interface 310, the processor 104 can determine that the main function of the first user interface 310 is used to let the user understand the functions. Therefore, when determining the first part to be removed from the first informative items 310_1-310_9, the processor 104 may preferentially remove the informative items irrelevant to the main function of the interface as the first part, such as the first informative item 310_3, 310_6-310_9, etc., but the disclosure is not limited to this.

After updating the first user interface 310 to the first user interface 320, it can be seen that the first user interface 320 can provide a more acceptable amount of information for the user for merely including four informative items (i.e., the first informative items 320_1, 320_2, 320_3, and 320_4, which respectively correspond to the first informative items 310_1, 310_2, 310_4, and 310_5), thereby improving the user's operating experience include only four informative items.

It can be seen from the above that the method proposed by the present disclosure can update the user interface by adjusting the number of informative items when the number of informative items in a user interface does not fall within a predetermined range, such that the amount of information in the user interface can be optimized. In this way, the user would not have excessive psychological burden for facing too much information at a time during the operation, thereby improving the user's operating experience.

Further, the conventional user interface design mostly focuses on designs about qualitative factors such as layout and font without aiming for optimizing the amount of information in the user interface. However, the present disclosure can appropriately allocate excessive amounts of information, thereby improving the user's operational efficiency while reducing the psychological burden on the user.

Moreover, in other embodiments, the present disclosure may also keep the removed first part by other mechanisms. Specifically, when the processor 104 determines that the amount of information in the first user interface 310 is excessive, the processor 104 may add/create one or more user interfaces, and arrange the first part to these user interfaces, wherein the number of first informative items in each user interface falls within the predetermined range. In other words, when the amount of information included in a single user interface is determined to be excessive, the method of the present disclosure can distribute the amount of information to the newly added one or more user interfaces, such that each of the user interfaces may include proper amount of information (for example, 5 to 8 informative items). In this way, not only the informative items can be preserved, but the user would not feel psychological burdens when using each user interfaces for receiving too much amount of information at once.

Figure 4:
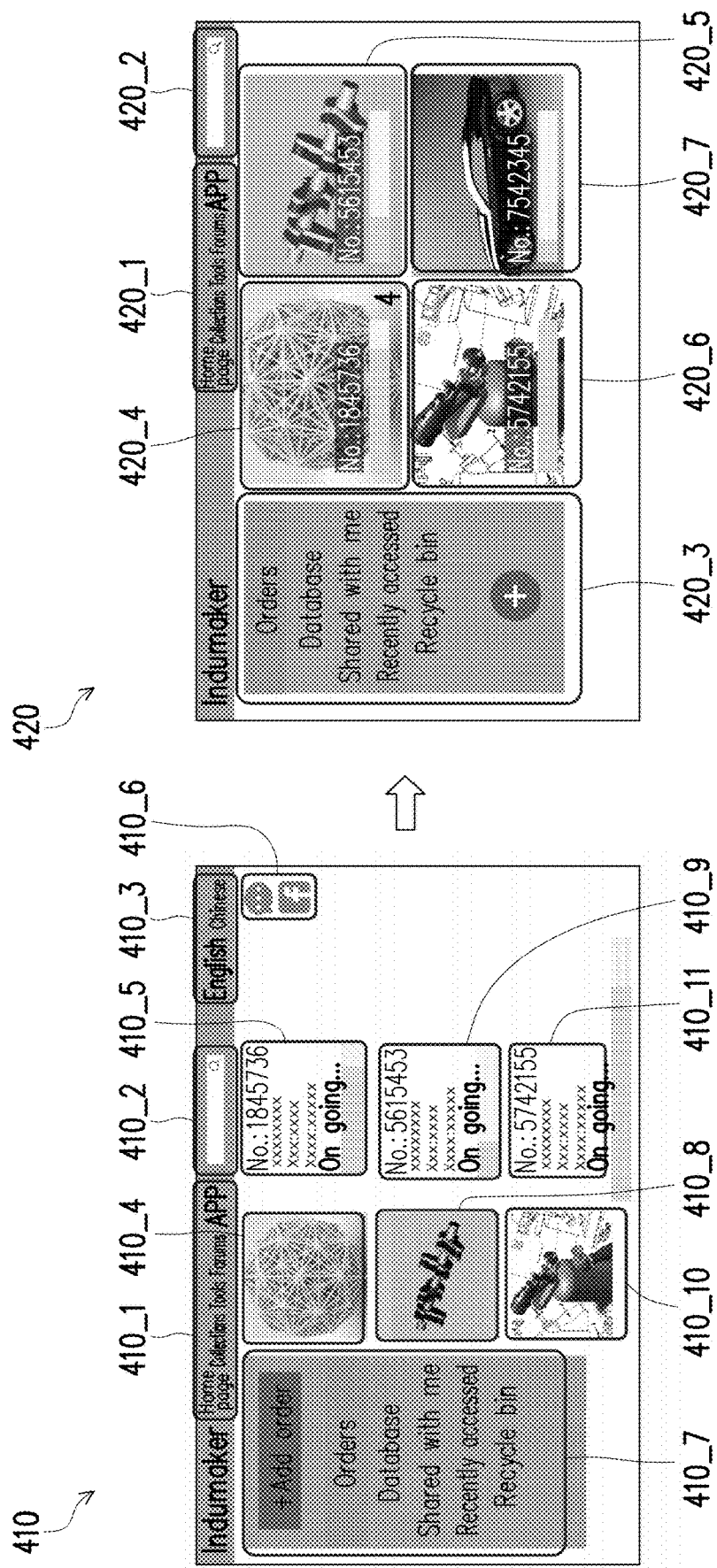
FIG. 4 is another application scenario according to an embodiment of the disclosure.

Please refer to FIG. 4, which is another application scenario according to an embodiment of the disclosure. In this embodiment, the second user interface 410 is, for example, another user interface in the foregoing software architecture, and the processor 104 can be used to identify second informative items 410_1, 410_2, 410_3, 410_4, 410_5, 410_6, 410_7, 410_8, 410_9, 410_10, and 410_1 from the second user interface 410 based on the teachings in the previous embodiments. Since the number of the second informative items 410_1-410_11 (i.e., 11) does not fall within the above predetermined range (i.e., 5 to 8), the second user interface 410 also causes the user to feel psychological burdens when using each user interfaces for receiving too much amount of information at once.

Correspondingly, the processor 104 can remove a second part of the second informative items 410_1-410_11 to update the second user interface 410 to the second user interface 420. Since only the second informative items 420_1-420_7 are included in the second user interface 410, the user can be effectively prevented from feeling additional psychological burdens during operation.

Figure 5:
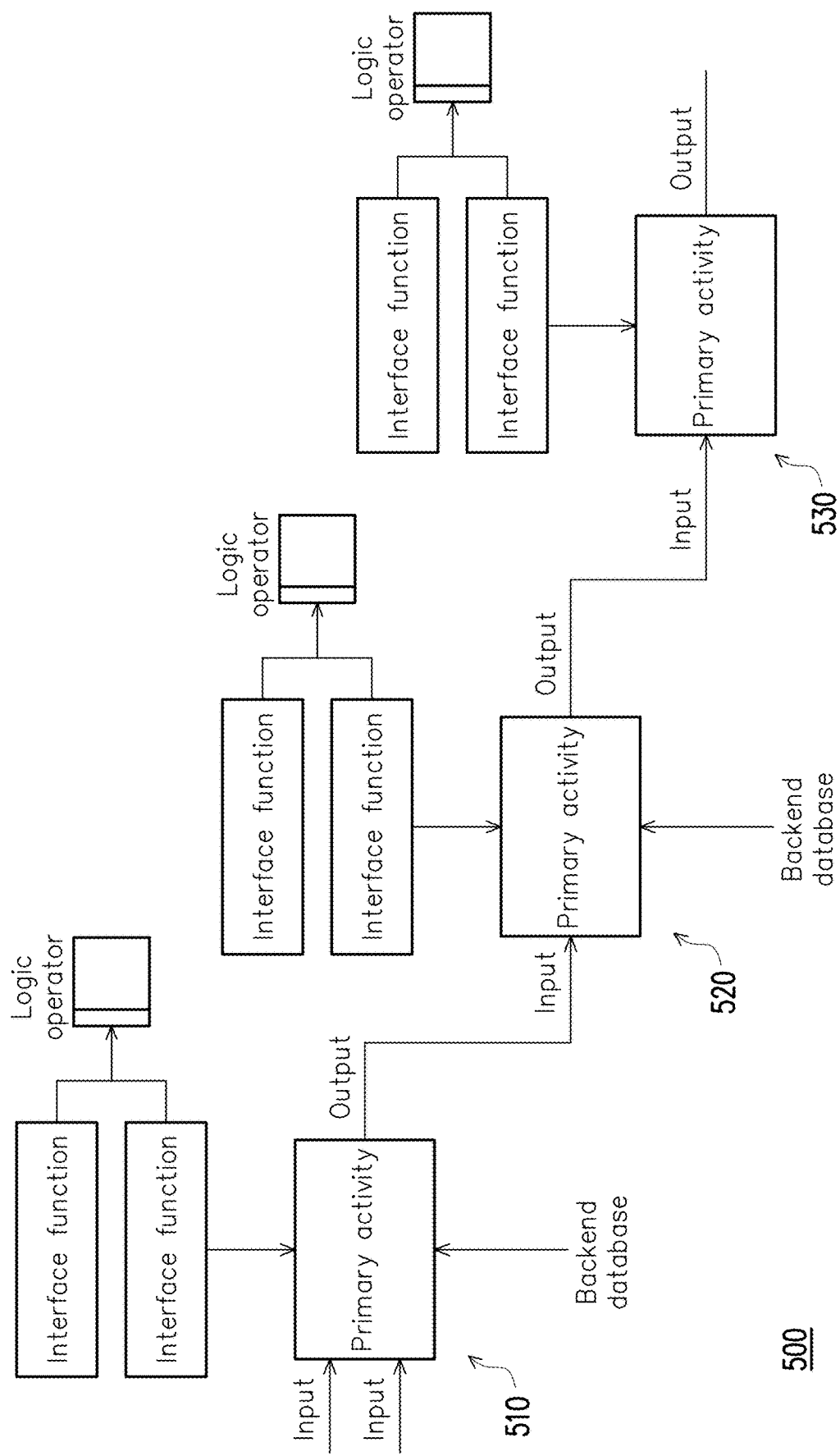
FIG. 5 is a schematic diagram of a software architecture according to an embodiment of the disclosure.

Please refer to FIG. 5, which is a schematic diagram of a software architecture according to an embodiment of the disclosure. As shown in FIG. 5, the software architecture 500 includes, for example, user interfaces 510, 520, and 530, which may be sequentially presented to the user in response to user operations. Different from the idea of designing a user interface based on the concept of a menu tree in the prior art, the software architecture 500 in this embodiment can record the main activity, input information, and output information in each of the user interfaces 510, 520, and 530 based on a first functional model. The aforementioned first functional model is, for example, an IDEF (ICAM Definition Languages) 0 model.

In addition, the software architecture 500 can also record a plurality of interface functions in the user interfaces 510, 520, and 530 and a logic operation relationship between the interface functions based on a second functional model. The aforementioned second functional model is, for example, an IDEF (ICAM Definition Languages) 3 model. Furthermore, the software architecture 500 can implement a connection with a backend database based on an entity relationship (ER) model.

As shown in FIG. 5, user interfaces 510, 520, and 530 can be used to receive a plurality of input information, and the input information corresponds to a plurality of interface functions. In an embodiment, when the logic operation results of the interface functions are true, the next user interface can be provided.

As can be seen from the above, the user interface proposed by the present disclosure can simultaneously cover aspects of the process, the function, the amount of information, and the connection of the backend database of the interface design, thereby improving the user experience of operating the user interface. In addition, the designers and developers may accordingly communicate more effectively and reduce understanding gaps. Further explanations will be provided below with reference to FIG. 6.

Figure 6:
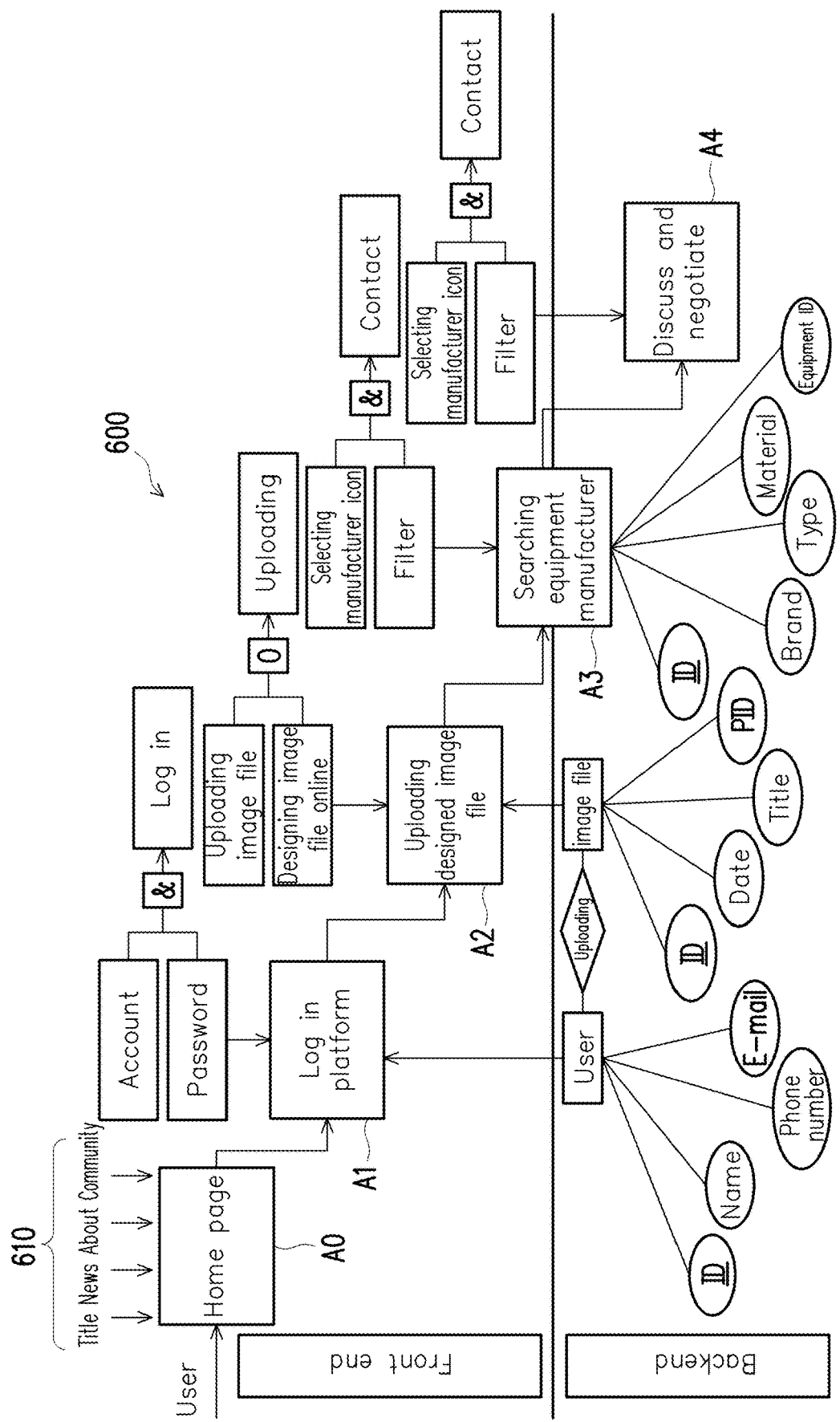
FIG. 6 is a schematic diagram of a software architecture according to an embodiment of the disclosure.

Please refer to FIG. 6, which is a schematic diagram of a software architecture according to an embodiment of the disclosure. In this embodiment, the software architecture 600 is, for example, a software platform that allows a user to log in and receive a user-provided image file, thereby assisting the user in finding manufacturers and equipment that can actually produce a physical object based on the image file. Roughly speaking, the software architecture 600 can include user interfaces A0, A1, A2, A3, and A4, each of which can be implemented based on the model disclosed in FIG. 5.

In FIG. 6, the user interface A0 is, for example, a home page, which can provide a number of informative items 610 for the user to refer to, and the arrangement of the number of these informative items 610 can be adjusted based on the teachings of the previous embodiments. In other embodiments, in addition to the part shown in FIG. 6, the user interface A0 may further include other informative items such as explore, resources, member management, etc., but the disclosure is not limited thereto.

The user interface A1 can provide the shown interface functions to allow the user to enter an account and password to log into the platform. In this embodiment, the software architecture 600 can perform an AND operation on the account and password input by the user, and provide a user interface A2 for use when the result of the AND operation is true. That is, the software architecture 600 may provide the user interface A2 for the user to operate after the user submitting correct account and password. In addition, after the user inputs the correct account and password, the software architecture 600 can obtain the user's identity (ID), name, phone number, E-mail and the like through the foregoing ER model, but the disclosure is not limited thereto.

In the user interface A2, the software architecture 600 can perform OR operation on the 3D image file and the online design file uploaded by the user, and provide the user interface A3 for the user to operate when the result of the logic operation is true. In other words, the user can choose to upload a 3D image file or directly design the image file online. After obtaining the image file from the user, the software architecture 600 can record the identity (PID), upload date, title, and user ID of the image file in the backend database accordingly.

In other embodiments, the user interface A2 may further include informative items that can be filled in by the user, such as a title of the file, contact information, and author information, but the disclosure is not limited thereto. In addition, in an embodiment, the user interface A2 can also be divided into sub-structures of multiple levels for the user to sequentially input information related to the image file. For example, the user interface A2 can be divided into three sub-interfaces, which can be used to allow the user to add the image file, confirm and publish, but the present disclosure is not limited thereto.

In the user interface A3, the software architecture 600 can provide a filter to the user, so that the user can input the required equipment manufacturer's conditions, such as location, brand, type, device ID, material, etc. The software architecture 600 can, for example, open the online map accordingly, and mark the equipment manufacturer's satisfying the user's requirements on the map. In this embodiment, the software architecture 600 can perform an AND operation on the results of the user on operating the filter and the icon, and provide the user interface A4 for the user to operate when the result of the AND operation is true. In addition, in an embodiment, the user interface A3 may include informative items such as map, address, material, size, and accuracy for the user to select, but the disclosure is not limited thereto.

In the user interface A4, the software architecture 600 can provide the user's contact information corresponding to the icon selected by the user to the user, so that the user can contact the equipment manufacturer to discuss and negotiate. Alternatively, the user can adjust the filter and the selection of icon again through the user interface A4 to find other qualified equipment manufacturers.

Figure 7:
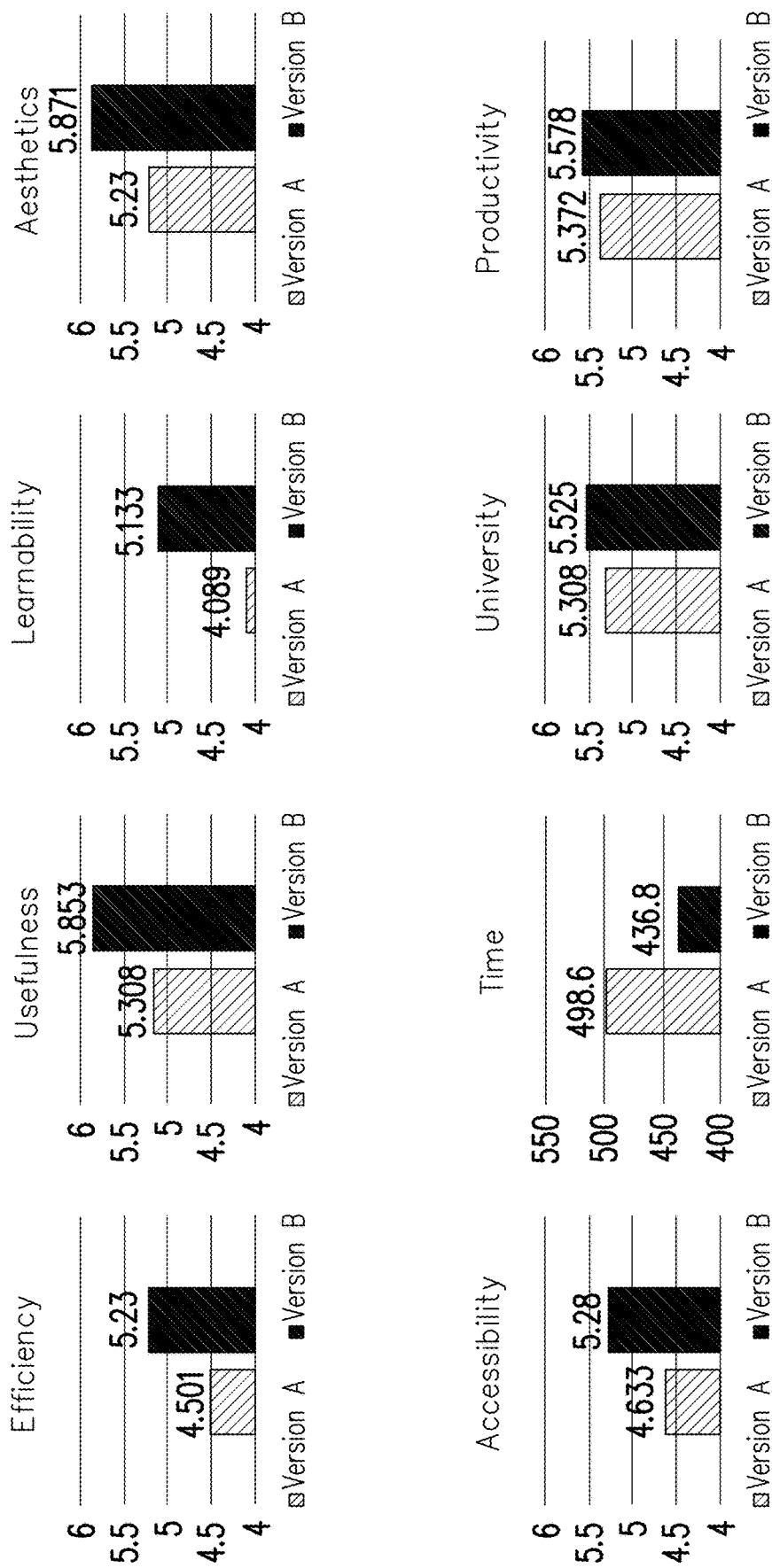
FIG. 7 is a schematic diagram of an improvement effect according to an embodiment of the present disclosure.

Please refer to FIG. 7, which is a schematic diagram of an improvement effect according to an embodiment of the present disclosure. In this embodiment, in order to prove that the user interface generated by the method proposed by the present disclosure can improve the user's operation experience, two versions of user interfaces are provided to different users to operate, wherein a version A of which is a user interface designed based on the concept of the prior art (for example, the first user interface 310 of FIG. 3 and the second user interface 410 of FIG. 4), and another version B is a user interface designed based on the method proposed by the present disclosure (for example, the first user interface 320 of FIG. 3 and the second user interface 420 of FIG. 4).

As shown in the statistical results of FIG. 7, the user interface of the version B generated in accordance with the concept of the present disclosure has better performance on aspects such as efficiency, usefulness, learnability, aesthetics and accessibility.

In summary, when the number of the informative items in a user interface does not fall within the predetermined range, the method for adaptively adjusting the amount of information in the user interface and the electronic device thereof can update the user interface by adjusting the number of informative items to optimize the amount of information in the user interface. In this way, the user would not feel psychological burdens during operation for receiving too much amount of information at once, thereby improving the user's operating experience. Different from the conventional design principles focusing on layout and fonts of user interfaces, the present disclosure can appropriately allocate the amount of information, thereby improving the user's operation efficiency while reducing the psychological burden of the user.

Moreover, since the present disclosure designs a user interface based on models such as IDEF0, IDEF3, and ER, aspects such as the process, functions, and amount of information of the interface design, the link between the back-end database can be simultaneously covered. As a result, the user experience on operating the user interface can be improved, and the designers and developers to communicate more effectively and reduce understanding gaps.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of adaptively adjusting the amount of information in a user interface, comprising:
    obtaining a software architecture and reading a first user interface in the software architecture, the first user interface being obtained at a device including an image capturing circuit;
    continuously capturing and recording, using the image capturing circuit, a plurality of eye images of the eyes of a user viewing the first user interface;
    analyzing the eye images to find a plurality of reference positions in the first user interface where the user's eyes stay for more than a predetermined time;
    defining the number of the reference positions as a number of a plurality of first informative items;
    identifying the number of the plurality of first informative items in the first user interface;
    in response to determining that the number of the first informative items in the first user interface does not fall within a predetermined range, updating the first user interface by removing a first part of the first informative items, wherein the number of the first informative items remaining in the updated first user interface falls within the predetermined range;
    adding a plurality of user interfaces, and arranging the first part among the plurality of user interfaces such that the number of the first informative items of the first part in each of the user interfaces falls into the predetermined range; and
    displaying the plurality of user interfaces.

2. The method of claim 1, wherein the predetermined range is 5 to 8.

3. The method of claim 1, further comprising:
    reading a second user interface in the software architecture;
    identifying a number of a plurality of second informative items in the second user interface;
    in response to determining that the number of the second informative items in the second user interface does not fall within the predetermined range, removing a second part of the second informative items to update the second user interface, wherein the number of the second informative items in the updated second user interface falls within the predetermined range.

4. The method of claim 1, wherein the software architecture further comprises a second user interface subsequent to the first user interface, the first user interface is configured to receive input information, where the input information corresponds to a plurality of interface functions, wherein when a logic operation result of the interface functions are true, subsequently providing the second user interface.

5. The method of claim 1, wherein the software architecture records a primary activity, an input message, and output information in the first user interface based on a first functional model.

6. The method of claim 5, wherein the software architecture records a plurality of interface functions in the first user interface and a logic operation relationship between the interface functions based on a second functional model.

7. The method of claim 6, wherein the software architecture implements a connection to a backend database based on an entity relationship model.

8. The method of claim 6, wherein the first functional model is an IDEF (Integrated Computer-Aided Manufacturing Definition Languages) 0 model, and the second functional model is an IDEF 3 model.

9. The method of claim 1, wherein the first informative items comprise at least one of a tag, a field, a button, a menu, and an icon.

10. The method of claim 1, wherein the step of identifying the number of the first informative items in the first user interface comprises:
    in response to determining that there is a particular user viewing the first user interface, controlling an external eye tracker to track a viewing behavior of the particular user's eyes for the first user interface, wherein the eye tracker records a plurality of pictures on the particular user's eyes, and marks a plurality of particular reference positions of the particular user's eyes staying in the pictures; and receiving a number of the particular reference positions returned by the eye tracker and defining the number of the particular reference positions as the number of the first informative items.

11. An electronic device comprising:
a storage circuit for storing a plurality of modules;
a processor coupled to the storage circuit and accessing the modules to perform the following steps:
obtaining a software architecture and reading a first user interface in the software architecture, the first user interface being obtained at a device including an image capturing circuit;
continuously capturing and recording, using the image capturing circuit, a plurality of eye images of the eyes of a user viewing the first user interface;
analyzing the eye images to find a plurality of reference positions in the first user interface where the user's eyes stay for more than a predetermined time;
defining the number of the reference positions as a number of a plurality of first informative items;
identifying the number of the plurality of first informative items in the first user interface;
in response to determining that the number of the first informative items in the first user interface does not fall within a predetermined range, updating the first user interface by removing a first part of the first informative items to, wherein the number of the first informative items remaining in the updated first user interface falls within the predetermined ranges;
adding a plurality of user interfaces, and arranging the first part among the plurality of user interfaces such that the number of the first informative items of the first part in each of the user interfaces falls into the predetermined range; and
displaying the plurality of user interfaces.

12. The electronic device of claim 11, wherein the predetermined range is 5 to 8.

13. The electronic device of claim 11, wherein the processor is further configured to:
reading a second user interface in the software architecture;
identifying a number of a plurality of second informative items in the second user interface;
in response to determining that the number of the second informative items in the second user interface does not fall within the predetermined range, removing a second part of the second informative items to update the second user interface, wherein the number of the second informative items in the updated second user interface falls within the predetermined range.

14. The electronic device of claim 11, wherein the software architecture further comprises a second user interface subsequent to the first user interface, the first user interface is configured to receive input information, where the input information corresponds to a plurality of interface functions, wherein when a logic operation result of the interface functions are true, subsequently providing the second user interface.

15. The electronic device of claim 11, wherein the software architecture records a primary activity, an input message, and output information in the first user interface based on a first functional model.

16. The electronic device of claim 15, wherein the software architecture records a plurality of interface functions in the first user interface and a logic operation relationship between the interface functions based on a second functional model.

17. The electronic device of claim 16, wherein the software architecture implements a connection to a backend database based on an entity relationship model.

18. The electronic device of claim 16, wherein the first functional model is an IDEF (Integrated Computer-Aided Manufacturing Definition Languages) 0 model, and the second functional model is an IDEF 3 model.

19. The electronic device of claim 11, wherein the first informative items comprise at least one of a tag, a field, a button, a menu, and an icon.

20. The electronic device of claim 11, wherein the processor is configured to:
in response to determining that there is a particular user viewing the first user interface, control an external eye tracker to track a viewing behavior of the particular user's eyes for the first user interface, wherein the eye tracker records a plurality of pictures on the particular user's eyes, and marks a plurality of particular reference positions of the particular user's eyes staying in the pictures; and
receiving a number of the particular reference positions returned by the eye tracker and define the number of the particular reference positions as the number of the first informative items.

* * * * *